United States Patent
Hellestam

(10) Patent No.: US 11,925,981 B2
(45) Date of Patent: Mar. 12, 2024

(54) METHOD, APPARATUS AND CONTROL UNIT FOR SELECTIVELY SINTERING A POWDER LAYER IN ADDITIVE MANUFACTURING PROCESSES TO ACHIEVE A FUTURE, DESIRED HEAT CONDUCTIVITY

(71) Applicant: Arcam AB, Mölnlycke (SE)

(72) Inventor: Carl Hellestam, Gothenburg (SE)

(73) Assignee: Arcam AB, Mölnlycke (SE)

( * ) Notice: Subject to any disclaimer, the term of this patent is extended or adjusted under 35 U.S.C. 154(b) by 122 days.

(21) Appl. No.: 16/915,276

(22) Filed: Jun. 29, 2020

(65) Prior Publication Data

US 2021/0402470 A1 Dec. 30, 2021

(51) Int. Cl.
*B22F 10/00* (2021.01)
*B22F 1/142* (2022.01)
*B22F 10/10* (2021.01)
*B29C 64/153* (2017.01)
*B29C 64/268* (2017.01)
*B29C 64/393* (2017.01)
*B33Y 10/00* (2015.01)
*B33Y 30/00* (2015.01)
*B33Y 40/10* (2020.01)
*B33Y 50/02* (2015.01)

(52) U.S. Cl.
CPC .............. *B22F 10/00* (2021.01); *B22F 1/142* (2022.01); *B29C 64/153* (2017.08); *B29C 64/268* (2017.08); *B29C 64/393* (2017.08); *B22F 10/10* (2021.01); *B22F 2203/11* (2013.01); *B33Y 10/00* (2014.12); *B33Y 30/00* (2014.12); *B33Y 40/10* (2020.01); *B33Y 50/02* (2014.12)

(58) Field of Classification Search
CPC .... B22F 2999/00; B22F 10/362; B22F 10/37; B22F 3/1017
See application file for complete search history.

(56) References Cited

U.S. PATENT DOCUMENTS

| 5,732,323 A | 3/1998 | Nyrhila |
| 7,419,632 B2 | 9/2008 | Keller |
| 8,142,687 B2 | 3/2012 | Fornes et al. |
| 9,649,690 B2 | 5/2017 | McMahan et al. |

(Continued)

FOREIGN PATENT DOCUMENTS

| AU | 2015271638 A1 * | 1/2017 | .............. B22F 10/20 |
| CN | 108290180 A * | 7/2018 | .............. B22F 10/00 |

(Continued)

OTHER PUBLICATIONS

DE 102011087374 (Year: 2013).*

(Continued)

*Primary Examiner* — Francisco W Tschen
*Assistant Examiner* — Guy F Mongelli
(74) *Attorney, Agent, or Firm* — Dinsmore & Shohl LLP

(57) ABSTRACT

Devices, systems, and methods for selectively sintering a powder layer in additive manufacturing processes to achieve a desired heat conductivity are disclosed. A method includes distributing a powder layer in a build chamber, selectively sintering the powder layer to form a plurality of sintered areas and a plurality of non-sintered areas based on a thermal model, and melting a subset of the plurality of sintered areas.

18 Claims, 6 Drawing Sheets

(56) References Cited

U.S. PATENT DOCUMENTS

| | | | | |
|---|---|---|---|---|
| 9,713,856 | B2* | 7/2017 | Fockele | B22F 12/30 |
| 9,789,563 | B2 | 10/2017 | Elfstroem et al. | |
| 9,895,842 | B2 | 2/2018 | Pfister et al. | |
| 10,130,993 | B2 | 11/2018 | Ljungblad et al. | |
| 2004/0022298 | A1* | 2/2004 | Gunawardena | G01K 13/06 |
| | | | | 374/E13.009 |
| 2004/0228754 | A1* | 11/2004 | Abe | B22F 10/20 |
| | | | | 419/6 |
| 2006/0119012 | A1* | 6/2006 | Ruatta | C23C 26/02 |
| | | | | 264/497 |
| 2007/0075461 | A1* | 4/2007 | Hunter | B29C 64/245 |
| | | | | 425/174 |
| 2008/0067722 | A1* | 3/2008 | Shen | B29C 64/153 |
| | | | | 264/401 |
| 2009/0152771 | A1* | 6/2009 | Philippi | B33Y 10/00 |
| | | | | 264/410 |
| 2009/0206065 | A1* | 8/2009 | Kruth | B29C 64/393 |
| | | | | 219/121.65 |
| 2012/0003086 | A1* | 1/2012 | Morris | F01D 25/28 |
| | | | | 415/200 |
| 2012/0211926 | A1 | 8/2012 | Larsson et al. | |
| 2014/0348692 | A1* | 11/2014 | Bessac | B33Y 10/00 |
| | | | | 419/53 |
| 2015/0352794 | A1* | 12/2015 | Nguyen | B22F 10/25 |
| | | | | 700/98 |
| 2016/0332370 | A1* | 11/2016 | Arai | B33Y 30/00 |
| 2017/0120332 | A1* | 5/2017 | DeMuth | B23K 15/0026 |
| 2017/0144424 | A1* | 5/2017 | Kiriyama | B22F 10/12 |
| 2017/0173736 | A1* | 6/2017 | Gray | B29C 64/282 |
| 2017/0364058 | A1* | 12/2017 | Jagdale | G05B 19/4099 |
| 2018/0147653 | A1 | 5/2018 | Kitamura et al. | |
| 2018/0297289 | A1* | 10/2018 | Barbati | B33Y 30/00 |
| 2020/0043885 | A1* | 2/2020 | Favre | G01N 27/02 |
| 2020/0338817 | A1* | 10/2020 | Murciego Rodriguez | |
| | | | | B29C 64/245 |
| 2021/0046699 | A1* | 2/2021 | Fleischmann | B33Y 70/10 |
| 2021/0178487 | A1* | 6/2021 | Bär | B22F 10/28 |
| 2021/0379824 | A1* | 12/2021 | Fung | B29C 64/264 |
| 2021/0403749 | A1* | 12/2021 | Fung | C09D 177/00 |

FOREIGN PATENT DOCUMENTS

| | | | | |
|---|---|---|---|---|
| DE | 102017113485 | A1 | 12/2018 | |
| EP | 3170649 | A1 * | 5/2017 | ........... B29C 64/153 |
| EP | 3178588 | A2 | 6/2017 | |
| JP | 2016175404 | A * | 10/2016 | |
| WO | WO-2015145844 | A1 * | 10/2015 | ............. B29B 13/08 |
| WO | WO-2015184495 | A1 * | 12/2015 | ............. B22F 10/20 |
| WO | 2019088114 | A1 | 5/2019 | |
| WO | 2021003309 | A2 | 1/2021 | |

OTHER PUBLICATIONS

Fockele translation NPL (Year: 2022).*
Solid Freeform Fabrication NPL Part 1 (https://link.springer.com/chapter/10.1007/978-1-4615-6327-3_6) (Year: 1997).*
Solid Freeform Fabrication NPL Part 2 (https://link.springer.com/chapter/10.1007/978-1-4615-6327-3_6) (Year: 1997).*
Solid Freeform Fabrication NPL Part 3 (https://link.springer.com/chapter/10.1007/978-1-4615-6327-3_6) (Year: 1997).*
Solid Freeform Fabrication NPL Part 4 (https://link.springer.com/chapter/10.1007/978-1-4615-6327-3_6) (Year: 1997).*
Solid Freeform Fabrication NPL Part 5 (https://link.springer.com/chapter/10.1007/978-1-4615-6327-3_6) (Year: 1997).*
WO-2015184495-A1 (Year: 2022).*
CN-108290180-A (Year: 2022).*
JP-2016175404-A translation (Year: 2023).*
FR 2984778 (Year: 2013).*
FR 2987293 (Year: 2013).*
CN 108883575 (Year: 2018).*
Manuela Galati et al: "A literature review of powder-based electron beam melting focusing on numerical simulations", Additive Manufacturing, vol. 19, Jan. 1, 2018 (Jan. 1, 2018), pp. 1-20, XP055737253, NL, ISSN: 2214-8604, DOI: 10.1016/j.addma.2017.11.001.
Philipp Drescher et al: "An Investigation of Sintering Parameters on Titanium Powder for Electron Beam Melting Processing Optimization", Materials, vol. 9, No. 12, Dec. 1, 2016 (Dec. 1, 2016), p. 97 4, XP055737974, CH, ISSN: 1996-1944, DOI: 10.3390/ma9120974.
Extended European Search Report for EP Application No. 21180054.5 dated Dec. 6, 2021 (11 pages).

* cited by examiner

METHOD, APPARATUS AND CONTROL UNIT FOR SELECTIVELY SINTERING A POWDER LAYER IN ADDITIVE MANUFACTURING PROCESSES TO ACHIEVE A FUTURE, DESIRED HEAT CONDUCTIVITY

FIELD

The present disclosure relates to devices, systems, and methods for achieving a desired heat conductivity across a powder layer in additive manufacturing processes, and more specifically, for selectively sintering a powder layer based on a thermal model.

BACKGROUND

In additive manufacturing processes, particularly those that utilize electron-beam melting of a powder layer to create an article, it is desirable to maintain a desired temperature across a powder layer to ensure a high control of material properties of the fused articles. Throughout the manufacturing processes, heat conductivities of powder layers often result in heat fluxes and undesired temperatures throughout the powder layer. It, therefore, becomes necessary to correct the undesired temperatures by locally heating regions of the powder layer that are cooler than desired, by applying the electron beam to the cool regions, for instance, and cooling regions of the powder layer that are warmer than desired, by pausing the manufacturing process and waiting for the warm regions to naturally dissipate heat. These methods, however, result in slower build rates and reduced productivity of the additive manufacturing process. Accordingly a need exists for alternative methods of achieving a desired temperature across a powder layer that do not substantially reduce build rates and productivity.

SUMMARY

In a first aspect, a method comprising: distributing a powder layer in a build chamber; selectively sintering the powder layer to form a plurality of sintered areas and a plurality of non-sintered areas based on a thermal model; and melting a subset of the plurality of sintered areas.

A second aspect includes the method of the first aspect further comprising preheating the powder layer before selectively sintering the powder layer.

A third aspect includes the method of any of the first-second aspects, wherein the subset of the plurality of sintered areas is melted to form a cross section of a three-dimensional article.

A fourth aspect includes the method of any of the first-third aspects, wherein an energy beam is used to preheat the powder layer, selectively sinter the powder layer, and melt the subset of the plurality of sintered areas.

A fifth aspect includes the method of any of the first-fourth aspects, wherein the powder layer is selectively sintered to achieve a desired heat conductivity.

A sixth aspect includes the method of any of the first-fifth aspects, wherein the desired heat conductivity results in a set temperature across the powder layer after melting the subset of the plurality of sintered areas and either before or after distributing a second powder layer above the powder layer.

A seventh aspect includes the method of any of the first-sixth aspects, wherein additional heat is applied to the powder layer after melting the subset of the plurality of sintered areas and either before or after distributing the second powder layer to correct a remaining temperature imbalance in the powder layer.

An eighth aspect includes the method of any of the first-seventh aspects, wherein the thermal model is used to predict a first heat conductivity of the powder layer based on one or more of: an energy beam irradiation strategy, a design of the three-dimensional article; a previous powder layer in the build chamber, a power of the energy beam used to melt the subset of the plurality of sintered areas, a material of the powder layer, and a mass of the three-dimensional article.

A ninth aspect includes the method of any of the first-eighth aspects, wherein the energy beam irradiation strategy comprises a specific sequence of scan lines of the energy beam to melt the subset of the plurality of sintered areas, a speed at which the specific sequence of scan lines is carried out, and a beam shape of the energy beam.

A tenth aspect includes the method of any of the first-ninth aspects, wherein the design of the three-dimensional article comprises a specific geometry of the cross section of the three-dimensional article and a spatial geometry between multiple parts of the cross section.

An eleventh aspect includes the method of any of the first-tenth aspects, wherein the previous powder layer in the build chamber comprises a temperature of the previous powder layer, the previous powder layer distributed in the build chamber and irradiated with the energy beam before the powder layer is distributed in the build chamber.

In a twelfth aspect, an additive manufacturing system, the additive manufacturing system comprising: a build chamber comprising a powder distributor and a build platform, the build platform configured to support a powder layer, the powder distributor movable over the build platform to distribute the powder layer; an energy beam source; and an electronic control unit including a processing device. The processing device is configured to distribute the powder layer in the build chamber with the powder distributor, selectively sinter the powder layer with the energy beam source to form a plurality of sintered areas and a plurality of non-sintered areas based on a thermal model, and melt a subset of the plurality of sintered areas with the energy beam source.

A thirteenth aspect includes the additive manufacturing system of the twelfth aspect, wherein the subset of the plurality of sintered areas is melted to form a cross section of a three-dimensional article.

A fourteenth aspect includes the additive manufacturing system of any of the twelfth-thirteenth aspects, wherein the powder layer is selectively sintered to achieve a desired heat conductivity.

A fifteenth aspect includes the additive manufacturing system of any of the twelfth-fourteenth aspects, wherein the desired heat conductivity results in a set temperature across the powder layer after the subset of the plurality of sintered areas is melted and either before or after a second powder layer is distributed above the powder layer.

A sixteenth aspect includes the additive manufacturing system of any of the twelfth-fifteenth aspects, wherein the thermal model is used to predict a first heat conductivity of the powder layer based on one or more of: an energy beam irradiation strategy, a design of the three-dimensional article; a previous powder layer on the build platform, a power of an energy beam used to melt the subset of the plurality of sintered areas, a material of the powder layer, and a mass of the three-dimensional article.

In a seventeenth aspect, an electronic control unit of an additive manufacturing device, the electronic control unit comprising a processor configured to distribute a powder layer in a build chamber, selectively sinter the powder layer to form a plurality of sintered areas and a plurality of non-sintered areas based on a thermal model, and melt a subset of the plurality of sintered areas.

An eighteenth aspect includes the electronic control unit of an additive manufacturing device of the seventeenth aspect, wherein the subset of the plurality of sintered areas is melted to form a cross section of a three-dimensional article.

A nineteenth aspect includes the electronic control unit of an additive manufacturing device of any of the seventeenth-eighteenth aspects, wherein the powder layer is selectively sintered to achieve a second desired heat conductivity.

A twentieth aspect includes the electronic control unit of an additive manufacturing device of any of the seventeenth-nineteenth aspects, wherein the thermal model is used to predict a first heat conductivity of the powder layer based on one or more of: an energy beam irradiation strategy, a design of the three-dimensional article; a previous powder layer in the build chamber, a power of an energy beam used to melt the subset of the plurality of sintered areas, a material of the powder layer, and a mass of the three-dimensional article.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

The present disclosure generally relates to devices, systems, and methods that achieve or maintain a desired or set temperature across a powder layer supported by a powder bed or build platform in a build chamber of an additive manufacturing system after select portions of the powder layer are melted or fused to form a cross section of a three dimensional article. The set temperature across the powder layer is achieved by generating a desired heat conductivity across the powder layer by selectively sintering regions of the powder layer based on a thermal model to form a plurality of sintered areas and a plurality of non-sintered areas. A subset of the plurality of sintered areas are melted with an energy beam, such as an electron beam, to fuse a cross section of the three dimensional article. Without maintaining a set temperature across the powder layer, the three dimensional article may not be appropriately formed.

Electron-beam additive manufacturing, which may also be known as electron-beam melting (EBM), is a type of additive manufacturing (3D printing) process that is typically used for metallic articles. EBM utilizes a raw material in the form of a metal powder or a metal wire, which is placed under a vacuum (e.g., within a vacuum sealed build chamber). Generally speaking, the raw material is melted or fused together from heating via an electron beam.

Systems that utilize EBM generally obtain data from a 3D computer-aided design (CAD) model and use the data to place successive layers of the raw material using an apparatus to spread the raw material, such as a powder distributor. The successive layers are melted together utilizing a computer-controlled electron beam. As noted above, the process takes place under vacuum within a vacuum sealed build chamber, which makes the process suited to manufacture parts using reactive materials having a high affinity for oxygen (e.g., titanium). In embodiments, the process operates at higher temperatures (up to about 1000° C.) relative to other additive manufacturing processes, which can lead to differences in phase formation though solidification and solid-state phase transformation.

Figure 1:
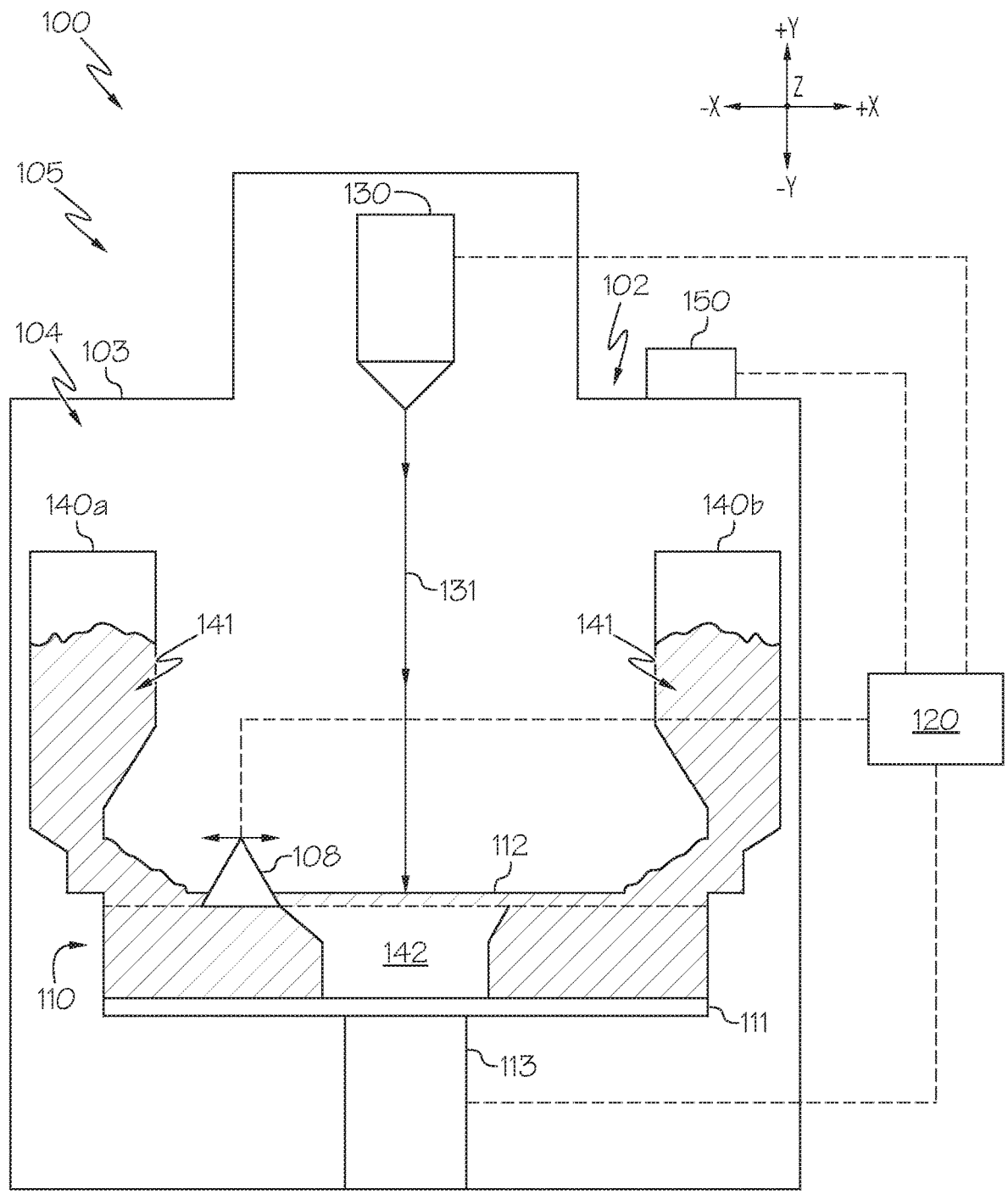
FIG. 1 schematically depicts a cutaway side view of an illustrative additive manufacturing system according to one or more embodiments shown and described herein.

FIG. 1 depicts a first embodiment of the present disclosure. As shown in FIG. 1, an additive manufacturing system 100 includes at least a build chamber 102 and a control component, or electronic control unit, 120. The build chamber 102 defines an interior 104 that is separated from an exterior environment 105 via one or more chamber walls 103.

In some embodiments, the interior 104 of the build chamber 102 may be a vacuum sealed interior such that an article 142 formed within the build chamber 102 is formed under optimal conditions for EBM, as is generally understood. The build chamber 102 is capable of maintaining a vacuum environment via a vacuum system. Illustrative vacuum systems may include, but are not limited to, a turbo molecular pump, a scroll pump, an ion pump, and one or more valves, as are generally understood. In some embodiments, the vacuum system may be communicatively coupled to the control component 120 such that the control component 120 directs operation of the vacuum system to maintain the vacuum within the interior 104 of the build chamber 102.

In some embodiments, the vacuum system may maintain a base pressure of about $1 \times 10^{-5}$ mbar or less throughout an entire build cycle. In further embodiments, the vacuum system may provide a partial pressure of He to about $2 \times 10^{-3}$ mbar during a melting process.

In other embodiments, the build chamber 102 may be provided in an enclosable chamber provided with ambient air and atmosphere pressure. In yet other embodiments, the build chamber 102 may be provided in open air.

The build chamber 102 generally includes within the interior 104 a powder bed 110 supporting a powder layer 112 thereon, as well as a powder distributor 108. In some embodiments, the build chamber 102 may further include one or more raw material hoppers 140a, 140b that maintain raw material 141 therein. In some embodiments, the build chamber 102 may further include an emitter, or energy beam source, 130. The build chamber 102 may further include other components, particularly components that facilitate EBM, including components not specifically described herein.

The powder bed 110 is generally a platform or receptacle located within the interior 104 of the build chamber 102 that is arranged to receive the raw material 141 from the one or more raw material hoppers 140a, 140b. The powder bed 110 is not limited in size or configuration by the present disclosure, but may generally be shaped and sized to hold an amount of the raw material 141 from the raw material hoppers 140a, 140b in the form of the powder layer 112, one or more portions of article 142, and/or unfused raw material 141, as described in greater detail herein.

In some embodiments, the powder bed 110 may include a movable build platform 111 supported by a lifting component 113. The movable build platform 111 may generally be a surface within the powder bed 110 that is movable by the lifting component 113 in a system vertical direction (e.g., in the +y/−y directions of the coordinate axes of FIG. 1) to increase and/or decrease a total volume of the powder bed 110. For example, the movable build platform 111 within the powder bed 110 may be movable by the lifting component 113 in a downward direction (e.g., toward the −y direction of the coordinate axes of FIG. 1) so as to increase the volume of the powder bed 110. In addition, the movable build platform 111 may be movable by the lifting component 113 to add each successive powder layer 112 to the article 142 being formed, as described in greater detail herein.

The lifting component 113 is not limited by the present disclosure, and may generally be any device or system capable of being coupled to the movable build platform 111 and movable to raise or lower the movable build platform 111 in the system vertical direction (e.g., in the +y/−y directions of the coordinate axes of FIG. 1). In some embodiments, the lifting component 113 may utilize a linear actuator type mechanism to effect movement of the movable build platform 111. Illustrative examples of devices or systems suitable for use as the lifting component 113 include, but are not limited to, a scissor lift, a mechanical linear actuator such as a screw based actuator, a wheel and axle actuator (e.g., a rack and pinion type actuator), a hydraulic actuator, a pneumatic actuator, a piezoelectric actuator, an electromechanical actuator, and/or the like. In some embodiments, the lifting component 113 may be located within the build chamber 102. In other embodiments, the lifting component 113 may be only partially located within the build chamber 102, particularly in embodiments where it may be desirable to isolate portions of the lifting component 113 that are sensitive to the harsh conditions (high heat, excessive dust, etc.) within the interior 104 of the build chamber 102. In some embodiments, the lifting component 113 may be communicatively coupled to the control component 120 such that the control component 120 directs operation of the lifting component 113.

The powder distributor 108 is generally arranged and configured to lay down and/or spread a layer of the raw material 141 as the powder layer 112 in the powder bed 110 (e.g., on start plate or build platform 111 within the powder bed). That is, the powder distributor 108 is arranged such that movement of the powder distributor 108 is in a horizontal plane defined by the x-axis and the z-axis of the coordinate axes depicted in FIG. 1. For example, the powder distributor 108 may be an arm, rod, or the like that extends a distance in the z direction of the coordinate axes of FIG. 1 over or above the powder bed 110 (e.g., from a first end to a second end of the powder bed 110). In some embodiments, the length of the powder distributor 108 may be longer than a width of the build platform 111 such that the powder layer 112 can be distributed on each position of the build platform 111. In some embodiments, the powder distributor 108 may have a central axis in parallel with a top surface of the build platform 111 (e.g., generally parallel to the +x/−x axis of the coordinate axes of FIG. 1). One or more motors, actuators, and/or the like may be coupled to the powder distributor 108 to effect movement of the powder distributor 108. For example, a rack and pinion actuator may be coupled to the powder distributor 108 to cause the powder distributor 108 to move back and forth over the powder bed in the +x/−x directions of the coordinate axes of FIG. 1, as indicated by the double sided arrow depicted above the powder distributor 108 in FIG. 1. In some embodiments, movement of the powder distributor 108 may be continuous (e.g., moving without stopping, other than to change direction). In other embodiments, movement of the powder distributor 108 may be stepwise (e.g., moving in a series of intervals). In yet other embodiments, movement of the powder distributor 108 may be such that a plurality of interruptions occur between periods of movement.

The powder distributor 108 may further include one or more teeth (e.g., rake fingers or the like) that extend from the powder distributor 108 into the raw material from the raw material hoppers 140a, 140b to cause disruption of the raw material when the powder distributor 108 moves (e.g., to distribute the raw material, to spread the powder layer 112, etc.). For example, the powder distributor 108 may include a plurality of rake teeth extending from a bottom surface of the powder distributor 108. In some embodiments, the rake teeth may extend in a direction that is substantially perpendicular to a plane of the build platform 111 (e.g., perpendicular to the plane formed by the x-axis and y-axis of the coordinate axes depicted in FIG. 1). In another embodiment, the rake teeth may be slanted with respect to the build platform 111. An angle of the slanted rake teeth with respect to a normal to the build platform may be any value, and in some embodiments is between about 0° and about 45°. In some embodiments, each one of the plurality of rake teeth may be a metal foil or a metal sheet. The total length of the plurality of rake teeth may be longer than a width of the build platform 111 in order to make it possible to distribute powder on each position of the build platform 111. The rake teeth may also be shaped and sized to rake through the raw material to distribute the powder layer 112 on the build platform 111.

It should be understood that while the powder distributor 108 described herein generally extends a distance in the x direction of the coordinate axes depicted in FIG. 1 and moves in the +x/−x directions of the coordinate axes depicted in FIG. 1 to spread the powder layer 112 as described above, this is merely one illustrative example. Other configurations are also contemplated. For example, the powder distributor 108 may rotate about an axis to spread the powder layer 112, may articulate about one or more joints or the like to spread the powder layer 112, and/or the like without departing from the scope of the present disclosure.

In some embodiments, a cross section of the powder distributor 108 may be generally triangular, as depicted in FIG. 1. However, it should be understood that the cross section may be any shape, including but not limited to, circular, elliptical, quadratic, rectangular, polygonal or the like. A height of the powder distributor 108 may be set in order to give the powder distributor 108 a particular mechanical strength in the system vertical direction (e.g., along the +y/−y axis of the coordinate axes of FIG. 1). That is, in some embodiments, the powder distributor 108 may have a particular controllable flex in the system vertical direction. The height of the powder distributor may also be selected taking into account that the powder distributor 108 pushes an amount of the raw material 141. If the height of the powder distributor 108 is too small, the powder distributor 108 can only push forward a smaller amount relative to a higher powder distributor 108. However, if the height of the powder distributor 108 is too high, the powder distributor 108 may complicate the powder catching from a scree of powder, (e.g., the higher the height of the powder distributor 108, the more force may be required in order to catch a predetermined amount of powder from the scree of powder by moving the powder distributor 108 into the scree of powder and letting a predetermined amount of powder fall over the top of the powder distributor 108 from a first side in the direction of travel into the scree of powder to a second side in the direction of the build platform 111).

In some embodiments, the powder distributor 108 may be communicatively coupled to the control component 120, as depicted by the dashed line in FIG. 1 between the powder distributor 108 and the control component 120. As used herein, the term "communicatively coupled" generally refers to any link in a manner that facilitates communications. As such, "communicatively coupled" includes both wireless and wired communications, including those wireless and wired communications now known or later developed. As the powder distributor 108 is communicatively coupled to the control component 120, the control component 120 may transmit one or more signals, data, and/or the like to cause the powder distributor 108 to move, change direction, change speed, and/or the like. For example, a "reverse direction" signal transmitted by the control component 120 to the powder distributor 108 may cause the powder distributor 108 to reverse the direction in which it is moving (e.g., reverse movement in the +x direction to movement in the −x direction).

Each of the raw material hoppers 140a, 140b may generally be containers that hold an amount of the raw material 141 therein and contain an opening to dispense the raw material 141 therefrom. While FIG. 1 depicts two raw material hoppers 140a, 140b, the present disclosure is not limited to such. That is, any number of raw material hoppers may be utilized without departing from the scope of the present disclosure. Further, while FIG. 1 depicts the raw material hoppers 140a, 140b as being located within the interior 104 of the build chamber 102, the present disclosure is not limited to such. That is, the raw material hoppers 140a, 140b may be located outside or partially outside the build chamber 102 in various other embodiments. However, it should be understood that if a raw material hopper is located outside or partially outside the build chamber 102, one or more outlets of the raw material hoppers that supply the raw material 141 may be selectively sealed when not distributing the raw material 141 in order to maintain the vacuum within the build chamber 102.

The shape and size of the raw material hoppers 140a, 140b are not limited by the present disclosure. That is, the raw material hoppers 140a, 140b may generally have any shape and or size without departing from the scope of the present disclosure. In some embodiments, each of the raw material hoppers 140a, 140b may be shaped and or sized to conform to the dimensions of the build chamber 102 such that the raw material hoppers 140a, 140b can fit inside the build chamber. In some embodiments, the raw material hoppers 140a, 140b may be shaped and sized such that a collective volume of the raw material hoppers 140a, 140b is sufficient to hold an amount of raw material 141 that is necessary to fabricate the article 142, which includes a sufficient amount of material to form each successive powder layer 112 and additional material that makes up the unfused raw material 141.

The raw material hoppers 140a, 140b may generally have an outlet for ejecting the raw material 141 located within the raw material hoppers 140a, 140b such that the raw material 141 can be spread by the powder distributor 108, as described herein. In some embodiments, such as the embodiment depicted in FIG. 1, the raw material 141 may freely flow out of the raw material hoppers 140a, 140b under the force of gravity, thereby forming piles or scree of raw material 141 for the powder distributor 108 to spread. In other embodiments, the outlets of the raw material hoppers 140a, 140b may be selectively closed via a selective closing mechanism so as to only distribute a portion of the raw material 141 located within the respective raw material hoppers 140a, 140b at a particular time. The selective closing mechanisms may be communicatively coupled to the control component 120 such that data and/or signals transmitted to/from the control component 120 can be used to selectively open and close the outlets of the raw material hoppers 140a, 140b.

The raw material 141 contained within the raw material hoppers 140a, 140b and used to form the article 142 is not limited by the present disclosure, and may generally be any raw material used for EBM now known or later developed. Illustrative examples of raw material 141 include, but are not limited to, pure metals such as titanium, aluminum, tungsten, or the like; and metal alloys such as titanium alloys, aluminum alloys, stainless steel, cobalt-chrome alloys, cobalt-chrome-tungsten alloys, nickel alloys, and/or the like. Specific examples of raw material 141 include, but are not limited to, Ti6Al4V titanium alloy, Ti6Al4V ELI titanium alloy, Grade 2 titanium, and ASTM F75 cobalt-chrome (all available from Arcam AB, Molndal, Sweden). Another specific example of raw material 141 is INCONEL® alloy 718 available from Special Metals Corporation (Huntington WV).

In embodiments, the raw material 141 is pre-alloyed, as opposed to a mixture. This may allow classification of EBM with selective laser melting (SLM), where other technologies like selective laser sintering (SLS) and direct metal laser sintering (DMLS) require thermal treatment after fabrication. Compared to selective laser melting (SLM) and DMLS, EBM has a generally superior build rate because of its higher energy density and scanning method.

The emitter 130 is generally an energy beam source that emits an energy beam 131. The emitter 130 may be a device that emits an electron beam (e.g., a charged particle beam), such as, for example, an electron gun, a linear accelerator, or the like. The emitter 130 generates an energy beam 131 that may be used for melting or fusing together the raw material 141 when spread as the powder layer 112 on the build platform 111. The energy beam 131 generated by the emitter 130 may also be used for preheating the raw material 141 when spread as the powder layer 112 on the build platform 111 to an optimal ambient temperature. The energy beam 131 generated by the emitter 130 may also be used for sintering the raw material 141 when spread as the powder layer 112 on the build platform 111. In some embodiments, the emitter 130 may include at least one focusing coil, at least one deflection coil and an electron beam power supply, which may be electrically connected to an emitter control unit. In one illustrative embodiment, the emitter 130 generates a focusable electron beam with an accelerating voltage of about 60 kilovolts (kV) and with a beam power in the range of about 0 kilowatts (kW) to about 10 kW. The pressure in the vacuum chamber may be in the range of about $1 \times 10^{-3}$ mBar to about $1 \times 10^{-6}$ mBar when building the article 142 by fusing each successive powder layer 112 with the energy beam 131. In some embodiments, the emitter 130 may be communicatively coupled to the control component 120, as indicated in FIG. 1 by the dashed line between the emitter 130 and the control component 120. The communicative coupling of the emitter 130 to the control component 120 may provide an ability for signals and/or data to be transmitted between the emitter 130 and the control component 120, such as control signals from the control component 120 that direct operation of the emitter 130. In some embodiments, the additive manufacturing system 100 may include more than one emitter 130 that may be capable of generating multiple energy beams 131 simultaneously.

A sensing device 150 may be located in an area within or adjacent to the build chamber 102 and positioned to obtain information regarding the powder layer 112. In some embodiments, the sensing device 150 may be located in the exterior environment 105 outside the build chamber 102, yet positioned such that the field of view or sensed area of the sensing device 150 captures an area within the build chamber 102, such the powder layer 112. In the embodiments where the sensing device 150 is positioned outside the build chamber 102, the harsh environment within the interior 104 of the build chamber 102 does not affect operation of the sensing device 150. That is, the heat, dust, metallization, and/or the like that occurs within the interior 104 of the build chamber 102 will not affect operation of the sensing device 150. In embodiments, the sensing device 150 is fixed in position such that a field of view or sensed area thereof remains constant (e.g., does not change). Moreover, the sensing device 150 is arranged in the fixed position such that a field of view or sensed area of the sensing device 150 encompasses an entirety of the powder layer 112. That is, the sensing device 150 is capable of imaging or otherwise sensing the entire powder layer 112 within the build chamber 102.

In some embodiments, the sensing device 150 may be configured to collect a variety of information on the powder layer 112. As such, the sensing device 150 may include one or more sensors therein. In some embodiments, the sensing device 150 may include a signal processing unit or the like. For example, the sensing device 150 may include a diode type sensor that transforms the collected information into electrical signals. A signal processing unit may then be used to filter and amplify the electrical signals before transmission of the signals to a control or analyzing device, such as, for example, the control component 120.

In some embodiments, the sensing device 150 may include an imaging device, such as a camera or the like. As such, the sensing device 150 may obtain one or more images of the interior 104 of the build chamber 102. It should be understood that in such embodiments, the one or more chamber walls 103 of the build chamber 102 may include a window or the like such that the imaging device portion of the sensing device 150 can be positioned adjacent to the window to capture the one or more images. In such embodiments the sensing device (e.g., the imaging device) may generally be configured for sensing a heat response generated as a result of irradiation of the powder layer 112 with the energy beam 131. For example, the sensing device 150 (e.g., the imaging device) may be particularly configured (e.g., via components such as filters, image sensors, and/or the like) to obtain information in the infrared (IR) spectrum, the near infrared (NIR) spectrum, and/or the visible spectrum. In some embodiments, the sensing device 150 may be a pre-calibrated imaging device that is particularly calibrated for use as described herein. In some embodiments, the sensing device 150 may be a pyrometer.

In some embodiments, the sensing device 150 may further be a device particularly configured to provide signals and/or data corresponding to temperature of the powder layer 112 to the control component 120. As such, the sensing device 150 may be communicatively coupled to the control component 120, as indicated by the dashed lines depicted in FIG. 1 between the sensing device 150 and the control component 120.

The control component 120 is generally a device that is communicatively coupled to one or more components of the additive manufacturing system 100 (e.g., the powder distributor 108, the lifting component 113, the emitter 130, and/or the sensing device 150) and is particularly arranged and configured to transmit and/or receive signals and/or data to/from the one or more components of the additive manufacturing system 100. Additional details regarding the control component 120 will be discussed herein with respect to FIGS. 2A-2B.

Figure 2A:
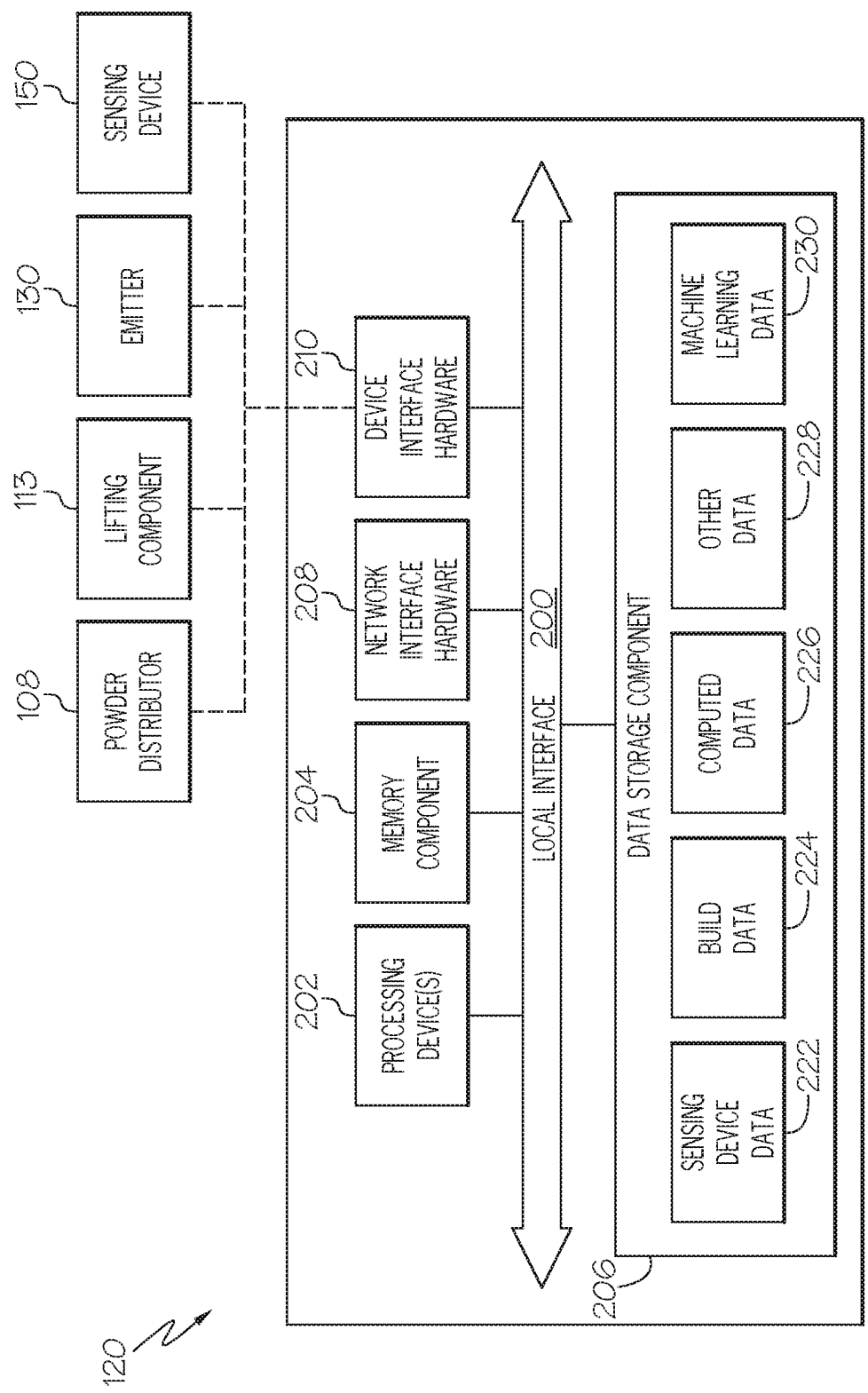
FIG. 2A depicts a block diagram of illustrative internal components of a control component of the additive manufacturing system of FIG. 1 according to one or more embodiments shown and described herein.

Referring now to FIGS. 1 and 2A, the various internal components of the control component 120 depicted in FIG. 1 are shown. Particularly, FIG. 2A depicts various system components for predicting an anticipated temperature, heat conductivity, and heat flux through the powder layer 112 while and/or after select portions of the powder layer 112 are melted to form a cross section of the article 142. FIG. 2A further depicts various system components for determining select areas of the powder layer 112 to sinter in order to alter the anticipated heat conductivity of the powder layer 112 to achieve a set temperature across the powder layer 112.

As illustrated in FIG. 2A, the control component 120 may include one or more processing devices 202, a non-transitory memory component 204, network interface hardware 208, device interface hardware 210, and a data storage component 206. A local interface 200, such as a bus or the like, may interconnect the various components.

The one or more processing devices 202, such as a computer processing unit (CPU), may be the central processing unit of the control component 120, performing calculations and logic operations to execute a program. The one or more processing devices 202, alone or in conjunction with the other components, are illustrative processing devices, computing devices, processors, or combinations thereof. The one or more processing devices 202 may include any processing component configured to receive and execute instructions (such as from the data storage component 206 and/or the memory component 204).

The memory component 204 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 204 may include one or more programming instructions thereon that, when executed by the one or more processing devices 202, cause the one or more processing devices 202 to complete various processes, such as the processes described herein with respect to FIG. 4.

Figure 2B:
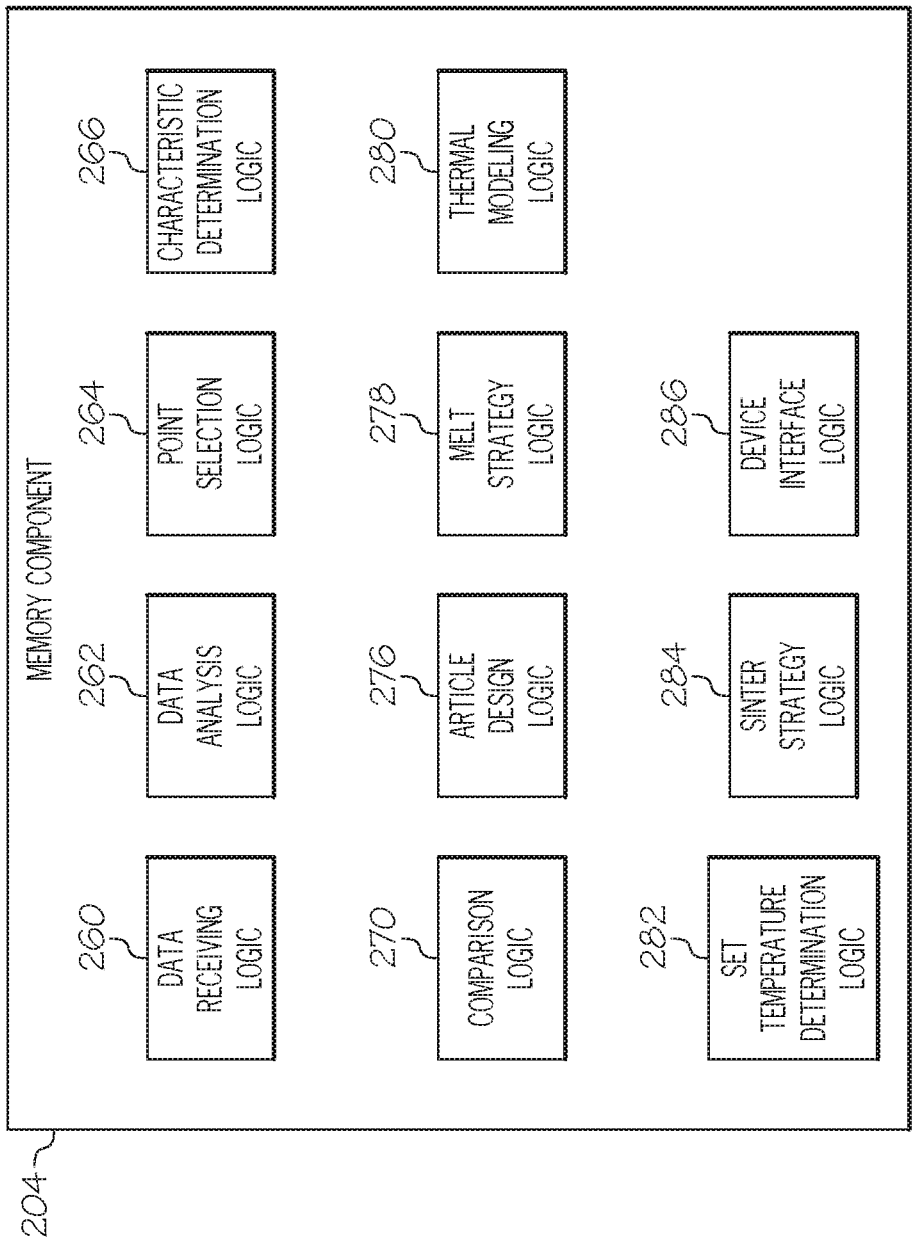
FIG. 2B depicts a block diagram of illustrative logic modules contained within a memory component of the control component of FIG. 2A according to one or more embodiments shown and described herein.

Still referring to FIG. 2A, the programming instructions stored on the memory component 204 may be embodied as a plurality of software logic modules, where each logic module provides programming instructions for completing one or more tasks. FIG. 2B depicts the various modules of the memory component 204 of FIG. 2A according to various embodiments.

As shown in FIG. 2B, the memory component includes a plurality of logic modules. Each of the logic modules shown in FIG. 2B may be embodied as a computer program, firmware, or hardware, as an example. Illustrative examples of logic modules present in the memory component 204 include, but are not limited to, data receiving logic 260, data analysis logic 262, point selection logic 264, characteristic determination logic 266, comparison logic 270, article design logic 276, melt strategy logic 278, thermal modeling logic 280, set temperature determination logic 282, sinter strategy logic 284, and device interface logic 286.

Referring to FIGS. 1, 2A, and 2B, the data receiving logic 260 includes one or more programming instructions for receiving data from the sensing device 150. That is, the data receiving logic 260 may cause a connection between the device interface hardware 210 and the sensing device 150 such that data transmitted by the sensing device 150 is received by the control component 120. Further, the data transmitted by the sensing device 150 may be stored (e.g., within the data storage component 206).

The data analysis logic 262 includes one or more programming instructions for analyzing data received from sensing device 150. That is, the data analysis logic 262 contains programming for analyzing the data collected by the sensing device 150 and determining temperatures throughout the powder layer 112. The data analysis logic 262 may further include programming instructions for analyzing data continuously as the energy beam 131 is applied to the powder layer 112.

Still referring to FIGS. 1, 2A, and 2B, the point selection logic 264 includes one or more programming instructions for selecting one or more points on the powder layer 112 from the sensor data for the purposes of analyzing changes to the one or more points, as described in greater detail herein. That is, the point selection logic 264 may contain programming for determining one or more points on the powder layer 112 to analyze sensor data for. For instance, if specific locations on the powder layer 112 are of interest, such as a particular area of the powder layer 112 that is fused to form a cross section of the article 142, the point selection logic 264 may enable analysis of the particular area. The point selection logic 264 may further include programming instructions for determining that the selected one or more points are located in a previously fused region of the powder bed 110 or will be a future fused region of the powder layer 112 based on the model of the article 142. In some embodiments, the one or more selected points may be assigned a location identifier such that the one or more points can later be determined in subsequent sensor data. For example, each one of the one or more points may be assigned coordinates relative to one or more fixed areas in the sensor data such that the points can be located at the same coordinates in subsequent collections of sensor data. That is, if a particular point is located 82 pixels up and 17 pixels to the right from a lower left hand corner of a thermal image of the entire powder layer 112, the point may be assigned coordinates of (17, 82) or the like. Other location identifiers should generally be understood.

Still referring to FIGS. 1, 2A, and 2B, the characteristic determination logic 266 includes one or more programming instructions for determining characteristics of the selected one or more points that have been selected according to the point selection logic 264. That is, the characteristic determination logic 266 may contain programming usable to determine characteristics of the powder layer 112 at the one or more points based on the data collected on the powder layer 112 at the one or more points. For example, the characteristic determination logic 266 may contain programming for determining characteristics such as brightness, intensity, color, and/or the like of a thermal image. In some embodiments, the characteristic determination logic 266 may contain programming to determine a current temperature of the one or more points of interest of the powder layer 112. In some embodiments, the characteristic determination logic 266 may contain programming that is usable to determine information pertaining to spatial temperature gradients between the one or more points and/or temporal changes in temperature at the one or more points.

The comparison logic 270 generally includes one or more programming instructions for comparing the characteristics of the selected one or more points at various intervals in time. That is, the comparison logic 270 may contain programming to compare characteristics of the one or more points, or monitor the one or more points, over time. Therefore, the comparison logic includes programming that allows for the determination of a current heat conductivity throughout the powder layer 112. Based on data collected and analyzed as described above, such as the changes in temperature at each of a plurality of selected points over time, a current heat conductivity throughout the powder layer 112 can be determined and mapped.

The article design logic 276 generally includes one or more programming instructions for determining areas of the powder layer 112 to melt or fuse to form a cross section of the article 142 based on a user-input design of article 142, such as a CAD model. The article design logic 276 includes programming to determine the specific areas of the powder layer 112 to melt to form a cross section of the article 142, the geometries of the areas of the powder layer 112 to melt, and the spatial relationship between the areas (e.g. the positions of the areas with respect to each other) of the powder layer 112 to melt. The article design logic 276 also includes programming instructions to determine the areas of previous powder layers beneath the powder layer 112 that have been previously fused to form cross sections of the article 142. Based on the determination of the previously fused areas of previous powder layers, or the fused regions throughout the depth (e.g., in the +y/−y directions of the coordinate axes of FIG. 1) of the powder bed 110, the article design logic 276 may include programming instructions to further determine the locations and masses of fused regions of the powder bed 110, which display different heat conductivity properties than loose powder The melt strategy logic 278 includes programming instructions for determining a programmed movement of the energy beam 131 and transmitting instructions to the emitter 130 accordingly. The melt strategy logic 278 may include programming instructions for optimally determining a movement of the energy beam 131, or an energy beam irradiation strategy, based on the regions of the powder layer 112 to melt to form a cross section of the article 142. The energy beam irradiation strategy, or the melt strategy, may include the speed at which the energy beam 131 is scanned across the areas of the powder layer 112 to melt the cross section of the article 142, the power of the energy beam 131 used to melt the cross section of the article 142, the shape of the energy beam 131 used to melt the cross section of the article 142, and the specific scan sequence used to melt the cross section of the article 142. The specific scan sequence may include the spatial or temporal distance between scan lines of the energy beam 131 in one or a plurality of areas of the powder layer 112 to melt. For instance, the scan sequence may comprise fully sequential scan lines, alternating scan lines between two areas of the powder layer 112, maintaining a temporal or spatial distance between adjacent scan lines, and the like. The melt strategy logic 278 includes programming to determine the energy beam irradiation strategy based on the raw material 141 being used in the build process and desired structural and mechanical properties of the completed article 142, as well as the geometric and spatial layout of the areas of the powder layer 112 to melt to form a cross section of the article 142.

Still referring to FIGS. 1, 2A, and 2B, the device interface logic 286 includes one or more programming instructions for establishing communicative connections with the various devices or components of the additive manufacturing system 100. For example, the device interface logic 286 may include programming instructions usable to establish connections with the powder distributor 108, the emitter 130, the sensing device 150 and/or the lifting component 113 in various embodiments.

The thermal modeling logic 280 includes one or more programming instructions for fitting the information gathered or determined by the data receiving logic 260, the data analysis logic 262, the point selection logic 264, the characteristic determination logic 266, the comparison logic 270, the article design logic 276, and the melt strategy logic 278 into a mathematical, thermal model. For example, the thermal modeling logic 280 includes one or more programming instructions for fitting a current temperature of the powder layer 112 or points of the powder layer 112, a current heat conductivity across the powder layer 112, the mass and location of the regions of the powder bed 110 that were previously fused, the specific geometry of the cross section of the article 142 to form from the powder layer 112 and the spatial geometry between multiple parts of the cross section, the material or composition of the powder layer 112, and the energy beam irradiation or melt strategy to form the cross section of the article 142 in the powder layer 112 into the thermal model. The thermal modeling logic 280 includes one or more programming instructions for predicting a future temperature, a future heat conductivity, and a future heat flux across the powder layer 112 while and/or after areas of the powder layer 112 are melted to form a cross section of the article 142 from the thermal model and the non-exhaustive list of variables above, which affect or determine heat conductivity.

The set temperature determination logic 282 includes one or more programming instructions for determining a desired temperature while and/or after areas of the powder layer 112 are melted to form a cross section of the article 142. In some embodiments, the set or desired temperature may correspond to the temperature across the powder layer 112 after areas of the powder layer 112 are melted to form a cross section of the article 142 and before an additional powder layer of raw material 141 is distributed by the powder distributor 108 over the powder layer 112. In some embodiments, the set or desired temperature may correspond to the temperature across the powder layer 112 after areas of the powder layer 112 are melted to form a cross section of the article 142 and after an additional powder layer of raw material 141 is distributed by the powder distributor 108 over the powder layer 112. In some embodiments, the set temperature may result in an equal temperature across the powder layer 112. In other words, every point of the powder layer may be at the same temperature. In other embodiments, the set temperature may result in an unequal temperature across the powder layer 112. For instance, it may be desirable to maintain higher temperatures in certain portions of the powder bed 110 or the powder layer 112 than in others.

Sinter strategy logic 284 includes one or more programming instructions to determine a specific sinter strategy of the powder layer 112. The sinter strategy logic 284 includes one or more programming instructions to determine a specific sinter strategy of the powder layer 112 based on the thermal modeling logic 280 and the set temperature determination logic 282. In other words, because sintered powder has a higher heat conductivity than non-sintered powder, the sinter strategy logic 284 determines specific areas of the powder layer 112 to sinter, thereby adjusting a predicted future heat conductivity across the powder layer 112. The adjusted heat conductivity, in turn, results in an adjusted heat flux across the powder layer 112. Therefore, the adjusted heat conductivity is able to achieve a desired or set temperature of the powder layer 112 while and/or after areas of the powder layer 112 are melted to form cross sections of the article 142.

Referring again to FIG. 2A, the network interface hardware 208 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 208 may be used to facilitate communication between external storage devices, user computing devices, server computing devices, external control devices, and/or the like via a network, such as, for example, a local network, the Internet, and/or the like.

Referring to FIGS. 1 and 2A the device interface hardware 210 may communicate information between the local interface 200 and one or more components of the additive manufacturing system 100. For example, the device interface hardware 210 may act as an interface between the local interface 200 and the powder distributor 108, the lifting component 113, the emitter 130, and the sensing device 150. The device interface hardware 210 may transmit or receive signals and/or data to/from the sensing device 150. The device interface hardware 210 may transmit control signals to the powder distributor 108, the lifting component 113, the emitter 130, the sensing device 150, and/or the like to effect control of said components.

Still referring to FIGS. 1 and 2A, the data storage component 206, which may generally be a storage medium, may contain one or more data repositories for storing data that is received and/or generated. The data storage component 206 may be any physical storage medium, including, but not limited to, a hard disk drive (HDD), memory, removable storage, and/or the like. While the data storage component 206 is depicted as a local device, it should be understood that the data storage component 206 may be a remote storage device, such as, for example, a server computing device, cloud based storage device, or the like. Illustrative data that may be contained within the data storage component 206 includes, but is not limited to, sensing device data 222, build data 224, computed data 226, machine learning data 230, and other data 228. The sensing device data 222 may generally be data that is used by the control component 120 to identify points of interest on the powder layer 112 and determine a temperature at the points of interest, monitor a change in temperature, and/or the like. The build data 224 may generally be used by the control component 120 to determine the specific geometry of a cross section of the article 142 in the powder layer 112, the spatial relationship between various parts of the cross section, the locations and masses of previously fused cross sections of the article 142 in the powder bed 110, and/or the like. The computed data 226 may generally be data used by the control component 120 to build a thermal model, predict a future heat conductivity of the powder layer 112 based on the thermal model, develop a sinter strategy based on the predicted future heat conductivity and the thermal model, and/or the like. The machine learning data 230 may generally be data that is generated as a result of one or more machine learning processes used to improve the thermal model, for instance. The other data 228 may generally be any other data that is usable for the purposes of predicting a future heat conductivity of the powder layer 112, developing an irradiation strategy, determining a set temperature, developing a sinter strategy, and/or the like, as described herein.

It should be understood that the components illustrated in FIGS. 2A and 2B are merely illustrative and are not intended to limit the scope of this disclosure. More specifically, while the components in FIGS. 2A and 2B are illustrated as residing within the control component 120, this is a non-limiting example. In some embodiments, one or more of the components may reside external to the control component 120.

Figure 3:
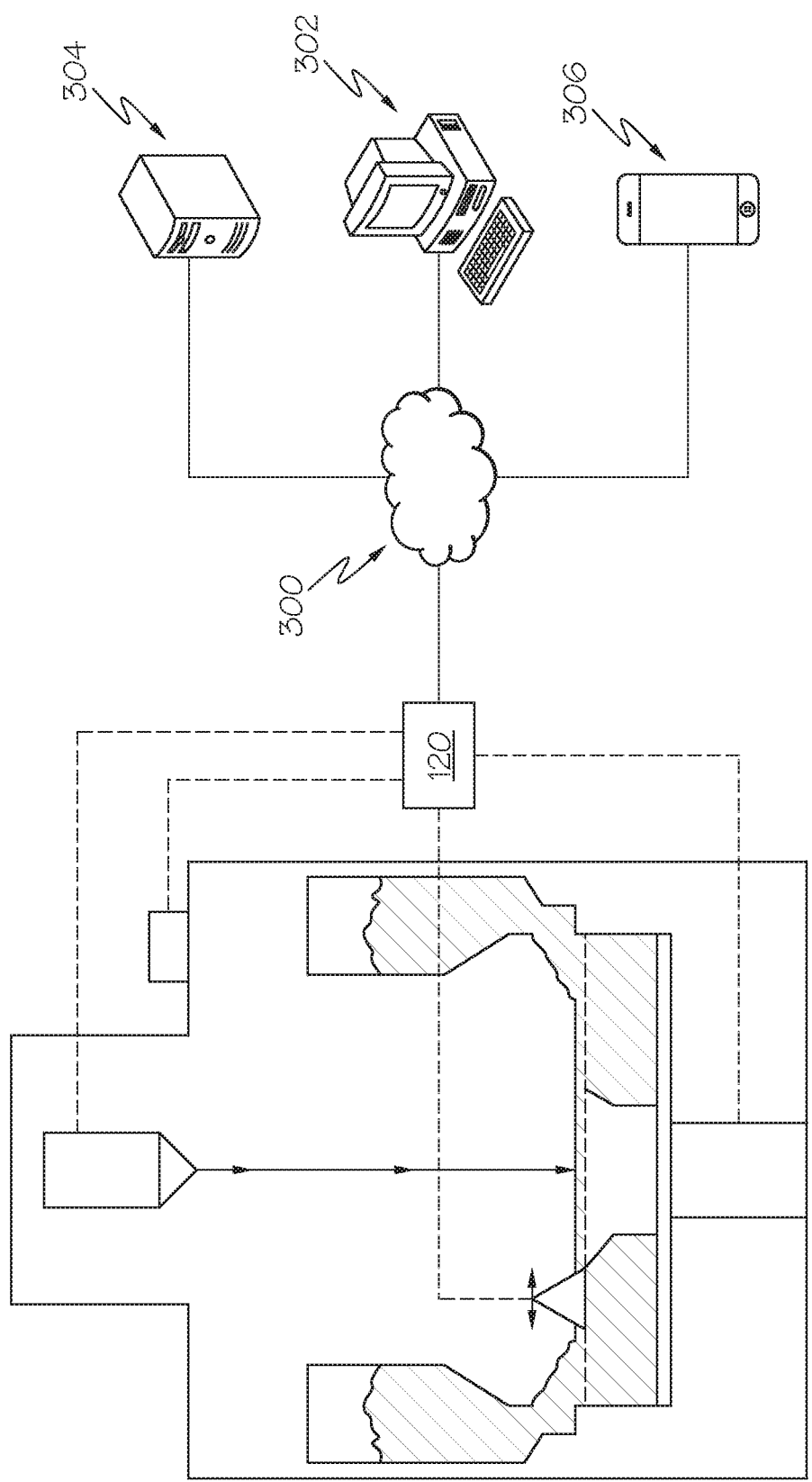
FIG. 3 depicts an illustrative control network according to one or more embodiments shown and described herein.

Referring now to FIG. 3, an illustrative control network 300 is depicted. As illustrated in FIG. 3, the control network 300 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The control network 300 may generally be configured to electronically connect one or more systems and/or devices, such as, for example, computing devices, servers, electronic devices, additive manufacturing systems, and/or components of any of the foregoing. Illustrative systems and/or devices may include, but are not limited to, a user computing device 302, a database server 304, an electronic device 306, and/or the control component 120 of the additive manufacturing system 100 of FIG. 1.

Still referring to FIG. 3, the user computing device 302 may generally be used as an interface between a user and the other components connected to the control network 300. Thus, the user computing device 302 may be used to perform one or more user-facing functions, such as receiving one or more inputs from a user or providing information to the user. Accordingly, the user computing device 302 may include at least a display and/or input hardware. In the event that any of the other devices connected to the control network 300 (e.g., the database server 304, the electronic device 306, and/or the control component 120), requires oversight, updating, and/or correction, the user computing device 302 may be configured to provide the desired oversight, updating, and/or correction. The user computing device 302 may also be used to input data that is usable to determine a type of material being used for additive manufacture, a number of emitters or energy beams to utilize, a desired irradiation or melt strategy, and/or the like. That is, a user may input information via the user computing device 302 to control various parameters of the additive manufacturing process.

The database server 304 may generally be a repository of data that is used for the purposes of calibrating the emitters and/or employing a particular melt strategy as described herein. That is, the database server 304 may contain one or more storage devices for storing data pertaining to information received from the sensing device 150, any generated calculations, and/or the like. In some embodiments, the database server 304 may contain information therein that mirrors the information stored in the data storage component 206 (FIG. 2A) or may be used as an alternative to the data storage component 206 (FIG. 2A), such as an offsite data repository. The database server 304 may be accessible by one or more other devices and/or systems coupled to the control network 300 and may provide the data as needed.

The electronic device 306 may generally be any device that contains hardware that is operable to be used as an interface between a user and the other components of the control network 300. Thus, the electronic device 306 may be used to perform one or more user-facing functions, such as, for example, receiving data one or more external components, displaying information to a user, receiving one or more user inputs, transmitting signals corresponding to the one or more user inputs, and/or the like. While FIG. 3 depicts the electronic device 306 as a smart phone, it should be understood that this is a nonlimiting example. That is, the electronic device 306 may be any mobile phone, a tablet computing device, a personal computing device (e.g., a personal computer), and/or the like.

It should be understood that while the user computing device 302 is depicted as a personal computer, the database server 304 is depicted as a server, and the electronic device 306 is depicted as a mobile device, these are nonlimiting examples. In some embodiments, any type of computing device (e.g., mobile computing device, personal computer, server, cloud-based network of devices, etc.) or specialized electronic device may be used for any of these components. Additionally, while each of these computing devices is illustrated in FIG. 3 as a single piece of hardware, this is also merely an example. Each of the user computing device 302, the database server 304, and the electronic device 306 may represent a plurality of computers, servers, databases, components, and/or the like.

While FIG. 3 depicts the various systems and/or components communicatively coupled to one another via the control network 300, this is merely illustrative. In some embodiments, various components may be communicatively coupled to one another via a direct connection. In some embodiments, various components may be integrated into a single device.

The various embodiments depicted in FIGS. 1, 2A-2B, and 3 should now generally be understood. The operation of the additive manufacturing system 100 will now be discussed with reference to FIG. 1 and the illustrative method 400 depicted in FIG. 4. In operation, during a work cycle, the movable build platform 111 may be lowered successively in relation to the emitter 130 (e.g., in the −y direction of the coordinate axes depicted in FIG. 1) after each added powder layer is placed. This means that the build platform 111 starts in an initial position, in which a first powder layer of a particular thickness is laid down on the build platform 111. In some embodiments, the first powder layer may be thicker than the other applied layers, so as to avoid a melt-through of the first layer onto the build platform 111. The build platform 111 is thereafter lowered in connection with laying down a second powder layer for the formation of a new cross section of the article 142.

In an example embodiment, the article 142 may be formed through successive fusion of layers of the raw material 141 supplied from the raw material hoppers 140a, 140b on the build platform 111 (e.g., successive fusion of layers of powder layers). Each layer corresponds to successive cross sections of the article 142. Such a fusion may be particularly completed based on instructions generated from a model of the article 142. In some embodiments, the model may be generated via a CAD (Computer Aided Design) tool.

In embodiments, the emitter 130 generates an electron beam that, when contacting the raw material 141 located on the build platform in the form of the powder layer 112, preheats the powder layer 112, sinters regions of the powder layer 112, or melts a subset of the sintered regions of the powder layer 112, depending on the shape, power, and speed of the energy beam, for instance. In some embodiments, the control component 120 may be used for controlling and managing the electron beam emitted from the emitter 130. At least one focusing coil (not shown), at least one deflection coil, and an electron beam power supply may be electrically connected or communicatively coupled to the control component 120, as indicated by the dashed lines between the control component 120 and the emitter 130 in FIG. 1. In an illustrative embodiment, the emitter 130 generates a focusable electron beam with an accelerating voltage of about 60 kilovolts (kV) and with a beam power in the range of about 0 kilowatts (kW) to about 6 kW. A pressure in the interior 104 of the build chamber 102 may be in the range of about $10^{-3}$ millibars (mBar) to about $10^{-6}$ mBar when constructing the article 142 by fusing each successive powder layer 112 with the energy beam.

In embodiments, a particular amount of raw material 141 may be provided on the build platform 111. The particular amount of raw material 141 is provided on the build platform 111 from one or more of the raw material hoppers 140a, 140b, in which the raw material 141 is ejected through the respective outlets on the raw material hoppers 140a, 140b, thereby creating a scree of raw material 141 on the build platform 111 (as well as the unfused raw material 141 on either side of the build platform 111).

At step 402 of method 400, the powder layer 112 is applied to the build platform 111 or powder bed 110. It should be understood that the use and arrangement of the raw material hoppers 140a, 140b to supply the raw material 141 used for forming the powder layer 112 described herein is merely illustrative. That is, other arrangements of supplying and providing raw material 141, such as a powder container with a moving floor located outside the build chamber 102 or the like is also contemplated and included within the scope of the present disclosure.

In embodiments, a layer from the raw material 141 may be provided on build platform 111. The layer from the raw material 141 may then be collected by the powder distributor 108 by moving the powder distributor 108 a particular distance in a first direction (e.g., in a direction along the plane formed by the x-axis and the z-axis of the coordinate axes depicted in FIG. 1) into the scree of the raw material 141, thereby allowing a particular amount of the raw material 141 to fall over a top of the powder distributor 108. The powder distributor 108 is then moved in a second direction (e.g., in another direction along the plane formed by the x-axis and the z-axis of the coordinate axes depicted in FIG. 1). In some embodiments, the second direction may be opposite to the first direction. Movement of the powder distributor 108 in the second direction may remove the particular amount of the raw material 141, which has fallen over the top of the powder distributor 108, from the scree of the raw material 141.

The particular amount of the raw material 141 removed from the scree of the raw material 141 (or provided by any other suitable mechanism) in front of the powder distributor 108 (e.g., adjacent to a leading end of the powder distributor 108) may be moved over the powder bed 110 and/or the build platform 111 by means of the powder distributor 108 (including the rake teeth thereof), thereby distributing the particular amount of the raw material 141 over the build platform 111 and forming a powder layer 112.

In embodiments, a distance between a lower part of the rake teeth and the upper part of the build platform 111 or a previous powder layer determines the thickness of the portion of the raw material 141 distributed over the build platform 111 or the previous powder layer. That is, a thickness of the powder layer 112 can be adjusted by adjusting the height of the build platform 111.

At step 404 of method 400, after the powder layer 112 is distributed over the build platform 111 or a previous powder layer of the powder bed 110, the control component 120 may collect variables on the heat conductivity and heat flux of the powder layer 112 with the sensing device 150, for example. As described in detail with respect to FIGS. 2A-2B, the control component 120 may determine the current temperature of one or more points of the powder layer 112 and/or a previous powder layer beneath the powder layer 112. The control component may also analyze the temperatures over time to determine a temperature gradient, heat conductivity, and heat flux throughout the powder layer 112 and/or a previous powder layer beneath the powder layer 112. Based on the model of the article 142 and the fusion of select areas of the previous powder layers of the powder bed 110, the control component may determine the masses and locations of the regions of the powder bed 110 that were previously fused. Also based on the model of the article 142, and as mentioned above, the control component 120 may determine the specific areas of the powder layer 112 to melt or fuse to form a cross section of the article 142. In other words, the control component 120 may determine the specific geometry of the cross section of the article 142 to form from melting the powder layer 112 and the spatial geometry between multiple parts or regions of the cross section. It should be understood, that in some embodiments, multiple articles may be formed in the build chamber 102, or on the build platform 111, at once. In such embodiments, the control component 120 determines not only the spatial relationship between multiple parts or regions of a cross section of a single article, but also the relationship between all parts or regions of the powder layer 112 to melt to form the cross sections of both articles.

Still with respect to step 404 of method 400, based on the model of the article 142, the specific raw material 141 being used, the desirable microstructures or mechanical qualities of the article 142, and the like, the control component 120 may determine a specific irradiation or melt strategy for the energy beam 131 to melt the select regions of the powder layer 112. As discussed with reference to FIGS. 2A-2B, the irradiation or melt strategy may include the power of the energy beam 131 used to melt the various portions of the cross section of the article 142. The irradiation or melt strategy may also include the speed at which the energy beam 131 is scanned over the portions of the powder layer 112 relating to the cross section of the article 142, as well as the shape of the energy beam when applied to the powder layer 112. The irradiation or melt strategy may further include a unique sequence of scan lines. For instance, and without limitation, if the cross section of the article 142 includes distinct parts or pieces, the irradiation strategy may include scanning a first part of the cross section with sequential scan lines of the energy beam 131 until the first part is melted or fused, and then proceeding to and fusing a second part of the cross section. In other embodiments, it may be desirable to alternate scan lines between the first and second parts of the cross section. In yet other embodiments, a set distance or time may be maintained between sequential scan lines. For instance, a second scan line that immediately follows a first scan line may not be adjacent to the first scan line, and/or may not be applied to the powder layer 112 until a specified amount of time has elapsed since the first scan line was applied. These are merely illustrative cases, however, and it should be readily understood that any irradiation or melt strategy is contemplated herein. It should also be appreciated that any number of the strategies discussed above, or otherwise, may be combined into one irradiation strategy. For instance, scan lines may be applied in an alternating fashion between two parts of a cross section and a second scan line may not be applied within a predetermined time interval after a first scan line is applied.

It should also be understood that the list of variables discussed above with respect to step 404 is not exhaustive. Similarly, the control component 120, as described with respect to FIGS. 2A-2B may be configured to collect data, information, and analytics on any number of variables that may influence the heat conductivity and heat flux of a powder layer.

At step 406 of the method 400, based on the above determinations and any other determinations or analyses carried out by the control component 120, the control component may build and apply a thermal model. In other words, the collected data and determinations made by the control component 120 at step 404 are fitted to a mathematical model or expression designed to build a thermal model of the powder layer 112. The thermal model allows the control component 120 to predict a future heat flux, heat conductivity, and temperature throughout the powder layer 112. Any or all variables discussed above with respect to step 404 may be applied to the thermal model, as information on the variables is available. For simplicity of discussion, the irradiation or melt strategy will be discussed herein. As discussed above with respect to step 404, the irradiation strategy may be determined based on specific structural and mechanical properties desired in the article 142. When melting or fusing the article 142 with the irradiation strategy, specific amounts of energy are applied to select portions of the powder layer 112. Based on the strategy (e.g. timing, sequence, etc.) of this energy input, the thermal model may predict the temperature throughout the powder layer 112 at a plurality of points in time in the future. The thermal model may predict the future temperature at any or all points throughout the powder layer 112. This future temperature may be predicted at one or more points in time while the irradiation or melt strategy is being completed. The thermal model may also predict the heat conductivity, which may be a result of the amount and placement of heat and energy input into the powder layer 112 (as well as the additional factors listed discussed with respect to step 404), at the selected points in time. In other words, the thermal model allows the control component 120 to predict the heat conductivity that will result throughout the powder layer 112 while and/or after the energy beam 131 melts the select areas of the powder layer 112 to form the cross section of the article 142 based on the factors and determinations listed above in step 404. By determining the future temperature and heat conductivity throughout the powder layer at a point in time, it follows that the thermal model is also able to predict a heat flux throughout the powder layer 112 at that point in time. In other words, the thermal model allows for determinations on how heat will travel throughout the powder layer 112 during the build process. By predicting the temperature, heat conductivity, and heat flux throughout the powder layer 112 while the irradiation strategy is being completed, the thermal model may make an accurate prediction of the final temperature through the powder layer 112 after the irradiation or melt strategy is completed.

As a basic illustrative example, if a first area of the powder layer 112 includes a high density of parts or pieces of the cross section of the article 142 (e.g. a large portion of the first area is melted), and a second area of the powder layer 112, a distance from the first area, includes a low density of parts or pieces of the cross section of the article 142 (e.g. a small portion of the first area is melted), it is likely that the first area of the powder layer 112 will have a higher temperature than the second area of the powder layer 112. Not only will a temperature difference result in the powder layer 112, but a certain thermal conductivity and heat flux will also result throughout the powder layer 112. The thermal conductivity and flux throughout the powder layer 112 in turn affects the temperature of the first and second areas of the powder layer 112. For instance, to some degree, heat will flow from the higher temperature areas of the powder layer 112 to the lower temperature areas of the powder layer 112. This flow of heat is limited based on the heat conductivity of the powder layer 112, however. For instance, if the material between high temperature areas and the low temperature areas displays a poor ability to conduct heat, then the flow of heat between the areas will be less than it would be if the material displays a high ability to conduct heat.

At step 408, the control component 120 determines a set or desired temperature throughout the powder layer 112 while and/or after melting the select regions of the powder layer 112 to form the cross section of the article 142. In some embodiments, the set temperature may be an equal temperature throughout the powder layer 112. In other embodiments, based on the desired microstructures or mechanical properties throughout the article 142, the set temperature may include localized areas of the powder layer 112 that are warmer or cooler than the rest of the powder layer 112. The set temperature may be the temperature of the powder layer 112 after melting select regions of the powder layer 112 and before placing a subsequent powder layer over the powder layer 112. In some embodiments, the set temperature may be the temperature of the powder layer 112 after melting select regions of the powder layer 112 and after placing a subsequent powder layer over the powder layer 112.

At step 410, based on the thermal model generated at step 406 and the set temperature of the powder layer 112 determined at step 408, the control component 120 may then determine a sinter strategy for the powder layer 112. The sinter strategy may be generated to adjust the predicted heat conductivity of the powder layer 112 from the thermal model in order to achieve the set temperature. Sintered raw material 141 possesses a higher heat conductivity than non-sintered raw material 141. Therefore, the sinter strategy may employ a plurality of sintered areas and a plurality of non-sintered areas of variable sizes throughout the powder layer 112 to adjust a heat conductivity throughout the powder layer 112 to achieve the set temperature. In other words, the irradiation strategy to melt the cross section of the article 142 in the powder layer 112 may remain the same as it was determined at step 404. However, by selectively sintering areas of the powder layer 112, the heat conductivity of the powder layer 112 is adjusted, which in turn affects the heat flux throughout the powder layer 112. The adjustment of the heat conductivity therefore allows for achieving the set temperature determined at step 408 after the irradiation strategy is complete instead of achieving the temperature throughout the powder layer 112 predicted at step 406. In all cases, the select areas of the powder layer 112 to melt to form a cross section of the article 142 are sintered. Additionally, the sinter strategy may require a minimum area around the select areas of the powder layer 112 to melt to be sintered. In other words, the sinter strategy may not allow a melted area of the powder layer 112 to directly border a non-sintered region of the powder layer 112. By sintering the select areas of the powder layer 112 to melt and a minimum area around the select areas to melt, smoke, or electrostatic discharge, may be minimized or avoided during the build process, and the melt properties of the powder layer 112 may be improved.

At step 412 of the method 400, the control component 120 may communicatively instruct the emitter 130 to direct the energy beam 131 over the powder layer 112 to preheat the powder layer 112 to a suitable ambient temperature.

At step 414 of the method 400, after the control component 120 determines the sinter strategy, the control component 120 may instruct the energy beam 131 over the powder layer 112 at a desired power, focus, and the like, to sinter the regions of the powder layer 112 determined in the sinter strategy step 410.

At step 416 of the method 400, following sintering of the powder layer 112 at step 414, the control component 120 may instruct the energy beam 131 over the powder layer 112 to melt or fuse select areas of the powder layer 112 to form a cross section of the article 142. The powder layer 112 may be melted with the irradiation strategy determined at step 404. Due to the sinter strategy, following melting of the select areas of the powder layer 112, the set temperature is achieved throughout the powder layer 112 because of the adjusted heat conductivity of the powder layer 112. FIGS. 5A-5D depict illustrative examples of the powder layer 112 following the melting step 416 when different sinter strategies are utilized. As can be seen in the FIGS. 5A-5D, different sinter strategies result in different arrangements of sintered regions 502 and non-sintered regions 504 of the powder layer 112 around melted areas 506. The melted areas 506 make up the cross section of the article 142 in the powder layer 112. Despite the position of the melted areas 506 remaining constant, because of the different sinter strategies depicted in FIGS. 5A-5D, a different heat conductivity throughout each powder layer 112 is achieved, and therefore different set temperatures throughout the powder layers 112 of FIGS. 5A-5D can also be achieved. In other words, after the completion of the melting process, different temperatures will result throughout the powder layers 112 depicted in FIGS. 5A-5D.

Referring back to method 400, at step 418, the temperature throughout the powder layer can be additionally adjusted or fine-tuned as needed. In other words, if the sinter strategy determined in step 410 is not perfectly accurate, the temperature throughout the powder layer 112 at the completion of the melting step 416 may not match the set temperature determined at step 408. For instance, some portions of the powder layer 112 may be warmer than desired and some portions of the powder layer 112 may be cooler than desired. In such cases, the build process may be temporarily paused for a certain amount of time to allow the warmer portions to cool down to the set temperature. Additionally, the energy beam 131 may be reapplied to the cooler regions at a specific power, speed, focus, and the like to increase the temperature at the cooler regions to the set temperature. In some embodiments, the step 418 may be unnecessary if the temperature throughout the powder layer 112 matches the set temperature immediately after completion of the melting step 416.

It should be understood that the method 400 is continuously completed until the article 142 is fully fabricated. In other words, once the method 400 is completed with respect to the powder layer 112, a subsequent powder layer is applied on top of the powder layer 112, and the method 400 is completed with respect to the subsequent powder layer. A unique sinter strategy may be applied to every powder layer in the powder bed 110 depending on the predicted heat conductivity of the powder layers, the set temperature of the powder layers, and the other variables and considerations discussed above.

Figure 4:
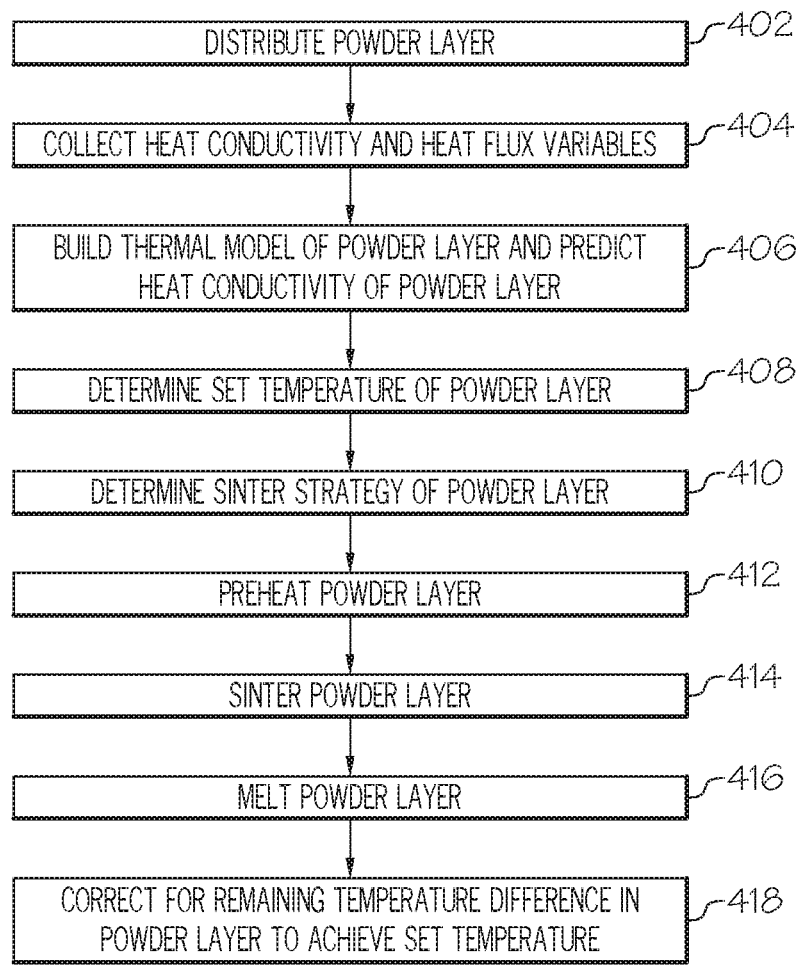
FIG. 4 depicts a flow diagram of an illustrative method of adjusting the heat conductivity of a powder layer according to one or more embodiments shown and described herein.
Figure 5A:
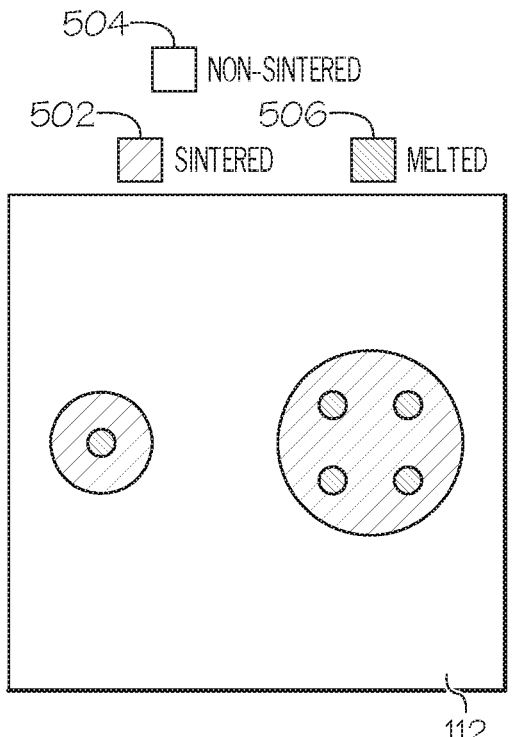
FIG. 5A depicts a first illustrative powder layer containing selectively sintered regions to achieve a desired heat conductivity throughout the powder layer according to one or more embodiments shown and described herein.
Figure 5B:
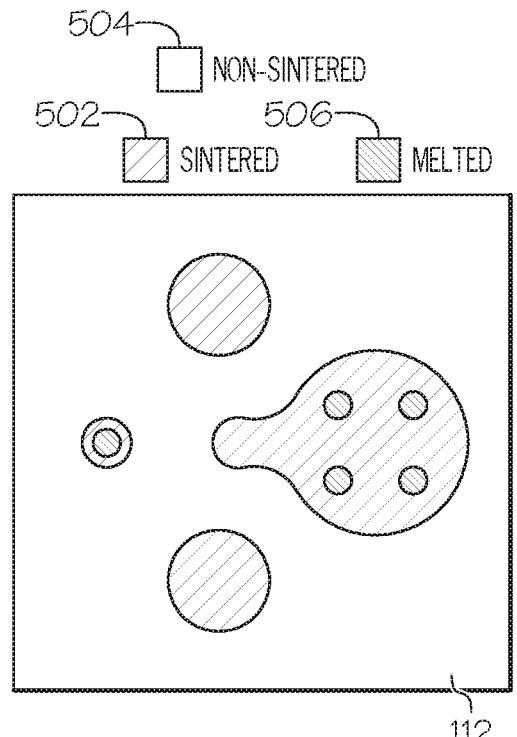
FIG. 5B depicts a second illustrative powder layer containing selectively sintered regions to achieve a desired heat conductivity throughout the powder layer according to one or more embodiments shown and described herein.
Figure 5C:
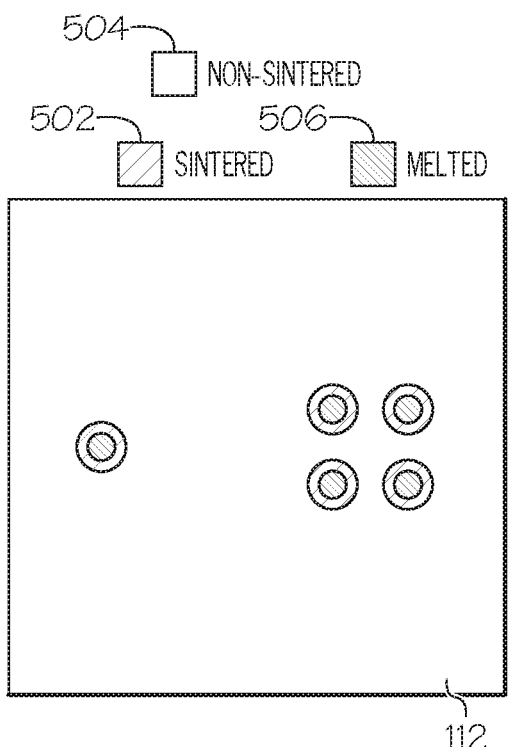
FIG. 5C depicts a third illustrative powder layer containing selectively sintered regions to achieve a desired heat conductivity throughout the powder layer according to one or more embodiments shown and described herein.
Figure 5D:
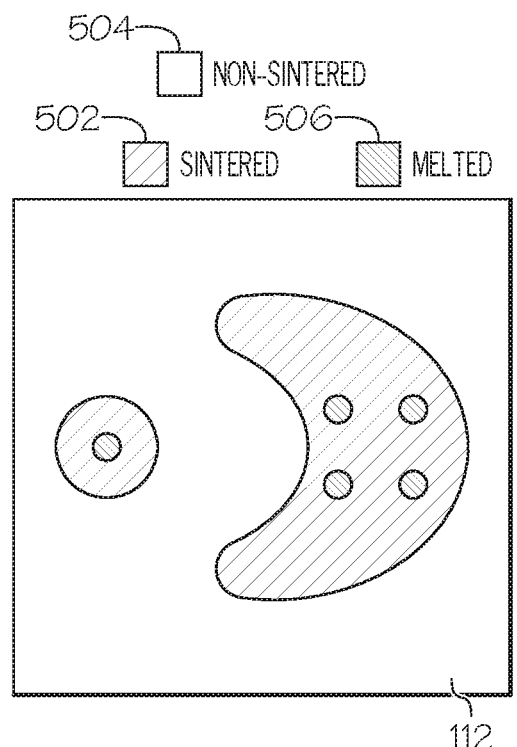
FIG. 5D depicts a fourth illustrative powder layer containing selectively sintered regions to achieve a desired heat conductivity throughout the powder layer according to one or more embodiments shown and described herein.

It should be appreciated that the method 400 discussed above is not limited to the order of steps presented in FIG. 4. For instance, in some embodiments, the set temperature determination step 408 may be completed simultaneously with or before steps 404 and 406 relating to the collection of heat conductivity variables and building the thermal model. As another example, in some embodiments, the step 412, relating to preheating the powder layer 112, may be completed simultaneously with or before any of steps 404, 406, 408, and 410. It should be appreciated that any order of steps may be implemented that increases processing speeds or the speed and efficiency of the build process. It should also be appreciated that in some embodiments one or more steps, or portions of steps, of the method 400 may be pre-calculated. For instance, with respect to step 406, the thermal model may built based partly on the data and information collected at step 404, and based partly on pre-calculations made independent of any sensor data analysis.

The additive manufacturing system 100 and method 400 discussed with reference to FIGS. 1, 2A-2B, 3, 4, and 5A-5D improve current methods of temperature correction in powder layers. While known methods attempt to retroactively correct for heat conductivity and heat flux throughout a powder layer, the present method is proactive. In other words, known methods selectively melt a powder layer, determine the temperature throughout the powder layer following the melting step, and then aim to correct the temperature to a desired temperature by adding heat to the powder layer or waiting for the powder layer to cool. Known methods observe the effects of the heat conductivity and heat flux through the powder layer and retroactively correct these effects, stalling the build process and reducing efficiency. In contrast, the present method predicts a heat conductivity and heat flux through the powder layer and proactively adjusts the heat conductivity, and therefore the heat flux, through the heat layer to achieve a desired temperature. The present method eliminates or reduces the need to retroactively correct the temperature throughout the powder layer by adding heat to the powder layer or waiting for the powder layer to cool following the melting step. Other known methods utilize dummy parts in the powder bed or powder layer. The dummy parts are not, in fact, a component of the three dimensional article being fabricated. Instead, the dummy parts are fused alongside the three dimensional article of interest to act as heat controlling objects in the powder bed. Following the fabrication process, the dummy parts are discarded. The utilization of dummy parts reduces build efficiency and harms the powder/part ratio of the build process. Therefore, unlike the known methods, the present method, controls the heat conductivity and temperature throughout a powder layer, resulting in greater control and improvement of the microstructure of fabricated parts, and does so without reducing build speeds, yields, or efficiency by avoiding or minimizing the need to retroactively adjust heat in the powder layer to account for heat conductivity and waste material with discarded parts.

It should now be understood that that the devices, systems, and methods described herein generate a desired heat conductivity throughout a powder layer supported by a build platform or powder bed in a build chamber of an additive manufacturing system. The desired heat conductivity is achieved by generating a sinter strategy that is based on a thermal model. The thermal model may determine a predicted heat conductivity throughout the powder layer. The sinter strategy results in selectively sintering the powder layer to form a plurality of sintered areas and a plurality of non-sintered areas of the powder layer. The size and placement of the plurality of sintered areas and the plurality of non-sintered areas adjusts the predicted heat conductivity to a desired heat conductivity. The desired heat conductivity then results in a set or desired temperature throughout the powder layer.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

1. A method comprising: distributing a powder layer in a build chamber; selectively sintering the powder layer to form a plurality of sintered areas and a plurality of non-sintered areas based on a thermal model; and melting a subset of the plurality of sintered areas.
2. The method of the preceding clause further comprising preheating the powder layer before selectively sintering the powder layer.
3. The method of any preceding clause, wherein the subset of the plurality of sintered areas is melted to form a cross section of a three-dimensional article.
4. The method of any preceding clause, wherein an energy beam is used to preheat the powder layer, selectively sinter the powder layer, and melt the subset of the plurality of sintered areas.
5. The method of any preceding clause, wherein the powder layer is selectively sintered to achieve a desired heat conductivity.
6. The method of any preceding clause, wherein the desired heat conductivity results in a set temperature across the powder layer after melting the subset of the plurality of sintered areas and either before or after distributing a second powder layer above the powder layer.
7. The method of any preceding clause, wherein additional heat is applied to the powder layer after melting the subset of the plurality of sintered areas and either before or after distributing the second powder layer to correct a remaining temperature imbalance in the powder layer.
8. The method of any preceding clause, wherein the thermal model is used to predict a first heat conductivity of the powder layer based on one or more of: an energy beam irradiation strategy, a design of the three-dimensional article; a previous powder layer in the build chamber, a power of the energy beam used to melt the subset of the plurality of sintered areas, a material of the powder layer, and a mass of the three-dimensional article.
9. The method of any preceding clause, wherein the energy beam irradiation strategy comprises a specific sequence of scan lines of the energy beam to melt the subset of the plurality of sintered areas, a speed at which the specific sequence of scan lines is carried out, and a beam shape of the energy beam.
10. The method of any preceding clause, wherein the design of the three-dimensional article comprises a specific geometry of the cross section of the three-dimensional article and a spatial geometry between multiple parts of the cross section.
11. The method of any preceding clause, wherein the previous powder layer in the build chamber comprises a temperature of the previous powder layer, the previous powder layer distributed in the build chamber and irradiated with the energy beam before the powder layer is distributed in the build chamber.
12. An additive manufacturing system, the additive manufacturing system comprising: a build chamber comprising a powder distributor and a build platform, the build platform configured to support a powder layer, the powder distributor movable over the build platform to distribute the powder layer; an energy beam source; and an electronic control unit including a processing device configured to: distribute the powder layer in the build chamber with the powder distributor; selectively sinter the powder layer with the energy beam source to form a plurality of sintered areas and a plurality of non-sintered areas based on a thermal model; and melt a subset of the plurality of sintered areas with the energy beam source.
13. The additive manufacturing system of the preceding clause, wherein the subset of the plurality of sintered areas is melted to form a cross section of a three-dimensional article.
14. The additive manufacturing system of any preceding clause, wherein the powder layer is selectively sintered to achieve a desired heat conductivity.
15. The additive manufacturing system of any preceding clause, wherein the desired heat conductivity results in a set temperature across the powder layer after the subset of the plurality of sintered areas is melted and either before or after a second powder layer is distributed above the powder layer.
16. The additive manufacturing system of any preceding clause, wherein the thermal model is used to predict a first heat conductivity of the powder layer based on one or more of: an energy beam irradiation strategy, a design of the three-dimensional article; a previous powder layer on the build platform, a power of an energy beam used to melt the subset of the plurality of sintered areas, a material of the powder layer, and a mass of the three-dimensional article.

17. An electronic control unit of an additive manufacturing device, the electronic control unit comprising a processor configured to: distribute a powder layer in a build chamber; selectively sinter the powder layer to form a plurality of sintered areas and a plurality of non-sintered areas based on a thermal model; and melt a subset of the plurality of sintered areas.

18. The electronic control unit of an additive manufacturing device of the preceding clause, wherein the subset of the plurality of sintered areas is melted to form a cross section of a three-dimensional article.

19. The electronic control unit of an additive manufacturing device of any preceding clause, wherein the powder layer is selectively sintered to achieve a second desired heat conductivity.

20. The electronic control unit of an additive manufacturing device of any preceding clause, wherein the thermal model is used to predict a first heat conductivity of the powder layer based on one or more of: an energy beam irradiation strategy, a design of the three-dimensional article; a previous powder layer in the build chamber, a power of an energy beam used to melt the subset of the plurality of sintered areas, a material of the powder layer, and a mass of the three-dimensional article.

What is claimed is:

1. A method comprising:
distributing a powder layer in a build chamber;
determining a set temperature of the powder layer;
selectively sintering the powder layer to form a plurality of sintered areas and a plurality of non-sintered areas based on a thermal model, the thermal model being used to predict a future heat conductivity of the powder layer based on a design of a three-dimensional article and a power of an energy beam used to melt a subset of the plurality of sintered areas;
melting the subset of the plurality of sintered areas;
determining, after melting, a remaining temperature imbalance between a temperature throughout the powder layer including the subset of the plurality of sintered areas and the determined set temperature of the powder layer, wherein the determined set temperature is greater than the temperature of the powder layer including the subset of the plurality of sintered areas; and
heating the powder layer after melting the subset of the plurality of sintered areas and before distributing a second powder layer to reduce the remaining temperature imbalance and achieve the future heat conductivity.

2. The method of claim 1, further comprising preheating the powder layer before selectively sintering the powder layer.

3. The method of claim 2, wherein the subset of the plurality of sintered areas is melted to form a cross section of the three-dimensional article.

4. The method of claim 3, wherein the energy beam is used to preheat the powder layer, selectively sinter the powder layer, and melt the subset of the plurality of sintered areas.

5. The method of claim 4, wherein the powder layer is selectively sintered to achieve a desired heat conductivity.

6. The method of claim 5, wherein the thermal model is used to predict the future heat conductivity of the powder layer based on one or more of: an energy beam irradiation strategy, a previous powder layer in the build chamber, a material of the powder layer, and a mass of the three-dimensional article.

7. The method of claim 6, wherein the energy beam irradiation strategy comprises a specific sequence of scan lines of the energy beam to melt the subset of the plurality of sintered areas, a speed at which the specific sequence of scan lines is carried out, and a beam shape of the energy beam.

8. The method of claim 6, wherein the design of the three-dimensional article comprises a specific geometry of the cross section of the three-dimensional article and a spatial geometry between multiple parts of the cross section.

9. The method of claim 6, wherein the previous powder layer in the build chamber comprises a temperature of the previous powder layer, the previous powder layer distributed in the build chamber and irradiated with the energy beam before the powder layer is distributed in the build chamber.

10. An additive manufacturing system, the additive manufacturing system comprising:
a build chamber comprising a powder distributor and a build platform, the build platform configured to support a powder layer, the powder distributor movable over the build platform to distribute the powder layer;
an energy beam source; and
an electronic control unit including a processing device configured to:
distribute the powder layer in the build chamber with the powder distributor;
determine a set temperature of the powder layer;
selectively sinter the powder layer with the energy beam source to form a plurality of sintered areas and a plurality of non-sintered areas based on a thermal model, the thermal model being used to predict a future heat conductivity of the powder layer based on a design of a three-dimensional article and a power of the energy beam used to melt a subset of the plurality of sintered areas; and
melt the subset of the plurality of sintered areas with the energy beam source,
determine, after melting, a remaining temperature imbalance between a temperature of the subset of the plurality of sintered areas and the determined set temperature of the powder layer, wherein the determined set temperature is greater than the temperature of the subset of the plurality of sintered areas; and
heat the powder layer after melting the subset of the plurality of sintered areas and before distributing a second powder layer to reduce the remaining temperature imbalance and achieve the future heat conductivity.

11. The additive manufacturing system of claim 10, wherein the subset of the plurality of sintered areas is melted to form a cross section of the three-dimensional article.

12. The additive manufacturing system of claim 11, wherein the powder layer is selectively sintered to achieve a desired heat conductivity.

13. The additive manufacturing system of claim 12, wherein the desired heat conductivity results in the set temperature across the powder layer after the subset of the plurality of sintered areas is melted and either before or after a second powder layer is distributed above the powder layer.

14. The additive manufacturing system of claim 12, wherein the thermal model is used to predict the future heat conductivity of the powder layer based on one or more of: an energy beam irradiation strategy, a previous powder layer on the build platform, a material of the powder layer, and a mass of the three-dimensional article.

15. An electronic control unit of an additive manufacturing device, the electronic control unit comprising a processor configured to:

distribute a powder layer in a build chamber;

determine a set temperature of the powder layer;

selectively sinter the powder layer to form a plurality of sintered areas and a plurality of non-sintered areas based on a thermal model, the thermal model being used to predict a future heat conductivity of the powder layer based on a design of a three-dimensional article and a power of an energy beam used to melt a subset of the plurality of sintered areas;

melt the subset of the plurality of sintered areas; and determine, after melting, a remaining temperature imbalance between a temperature of the subset of the plurality of sintered areas and the determined set temperature of the powder layer, wherein the determined set temperature is greater than the temperature of the subset of the plurality of sintered areas; and heat the powder layer after melting the subset of the plurality of sintered areas and before distributing a second powder layer to reduce the remaining temperature imbalance and achieve the future heat conductivity.

16. The electronic control unit of an additive manufacturing device of claim 15, wherein the subset of the plurality of sintered areas is melted to form a cross section of a three-dimensional article.

17. The electronic control unit of an additive manufacturing device of claim 16, wherein the powder layer is selectively sintered to achieve a second desired heat conductivity.

18. The electronic control unit of an additive manufacturing device of claim 17, wherein the thermal model is used to predict the future heat conductivity of the powder layer based on one or more of: an energy beam irradiation strategy, a previous powder layer in the build chamber, a material of the powder layer, and a mass of the three-dimensional article.

* * * * *